United States Patent [19]

Wheeler et al.

[11] Patent Number: 4,673,883

[45] Date of Patent: Jun. 16, 1987

[54] AUTOMATICALLY SCALED ENGINE DIAGNOSTIC APPARATUS

[76] Inventors: Michael J. Wheeler, 6107 N. Greeley, Portland, Oreg. 97217; Curtis W. Hart, 1821 D St., Madras, Oreg. 97741

[21] Appl. No.: 652,593

[22] Filed: Sep. 20, 1984

[51] Int. Cl.[4] .......... G01L 3/26

[52] U.S. Cl. .......... 324/384; 73/116

[58] Field of Search .......... 73/116; 123/406, 427, 123/426; 324/169, 378, 380, 384, 386, 402, 166, 168

[56] References Cited

U.S. PATENT DOCUMENTS

| | | | |
|---|---|---|---|
| Re. 26,163 | 2/1967 | Heyer . | |
| 2,809,344 | 10/1957 | Mayer . | |
| 2,986,032 | 5/1961 | Heyer . | |
| 3,572,103 | 3/1971 | Marino . | |
| 3,573,608 | 4/1971 | Marino . | |
| 3,788,129 | 1/1974 | Trussell . | |
| 3,940,977 | 3/1976 | Voross . | |
| 3,961,239 | 6/1976 | Lach | 324/384 |

FOREIGN PATENT DOCUMENTS

| | | | |
|---|---|---|---|
| 1285150 | 1/1962 | France | 324/169 |

OTHER PUBLICATIONS

Marston: "Over-Speed Alarms"—Radio Electronics—Oct. 1976, pp. 45–47.

Conradi: "Tachometer-Dwellmeter for Your Car''—Radio-Electronics, Mar. 65, pp. 56–57.

Swain: "Tacho/Dwell Meter . . . ", Electronics (Australia), Oct. 1980—pp. 40–51.

*Primary Examiner*—Reinhard J. Eisenzopf

*Assistant Examiner*—Jose M. Solis

*Attorney, Agent, or Firm*—Klarquist, Sparkman, Campbell, Leigh & Whinston

[57] ABSTRACT

An improved diagnostic apparatus for internal combustion engines; indicating engine speed, and dwell angle; capable of selectively inhibiting the firing of individual cylinders, and having: All readings automatically adjusted for the number of cylinders in the engine being tested; indication of proper synchronization with the engine under test; derivation of all operating power from the ignition signal of the engine under test.

17 Claims, 4 Drawing Figures

FIG. 4

| CYLINDER COUNT | FLIP-FLOP 113 | | FLIP-FLOP 114 | |
|---|---|---|---|---|
| | Q (37) | $\bar{Q}$ (115) | Q (38) | $\bar{Q}$ (118) |
| ≤ FOUR | 0 | 1 | 0 | 1 |
| FIVE OR SIX | 1 | 0 | 0 | 1 |
| ≥ SEVEN | 1 | 0 | 1 | 0 |

SEMICONDUCTOR SWITCH 87

| INPUT | 46 | 37 | 38 | OUTPUT SELECTED FROM LINE: |
|---|---|---|---|---|
| | 1 | X | X | 93 |
| | 0 | 0 | 0 | 30 |
| | 0 | 1 | 0 | 32 |
| | 0 | 1 | 1 | 94 |

1=HIGH, 0=LOW, X= DON'T CARE

AUTOMATICALLY SCALED ENGINE DIAGNOSTIC APPARATUS

BACKGROUND

The invention relates to diagnostic apparatus for internal combustion engines and more specifically to an improved apparatus for diagnosing and tuning engines utilizing multiple electrical igniters.

When diagnosing and tuning an engine it is desirable to know the engine speed, dwell angle - or coil charge time, and the contribution of individual cylinders to engine performance. Numerous devices that combine tachometer and dwell functions exist; these generally incorporate a meter movement with multiple scales for different ranges and engine types and sometimes a switch for the number of cylinders. The disadvantage of the above is the extra time and care required to read the correct scale and set the proper switches, for the engine under test.

Devices incorporating selective cylinder disablement to determine the contribution of individual cylinders have existed for some time. This type of device requires that a counter be synchronized with the engine in order to provide a disabling signal to the ignition circuit during the selected interval. This is accomplished by resetting the counter to its number one state by means of a signal taken from the number one ignitor wire, and advancing the counter one step for each pulse of the ignition primary signal. Due to the nature of the ignition system, (high voltage discharge) electrostatic and electromagnetic fields are produced at each spark interval that can cause the counter to reset at improper times. Although careful circuit layout and shielding can minimize this problem, there are many times in practice that the counter is "fooled" and an incorrect diagnosis results. Also the absence of a signal to the number one igniter due to an open wire or igniter will cause total loss of synchronization of the counter and again result in incorrect engine diagnosis.

All engine diagnostic equipment requires a source of power for operation. Simple meters for engine speed or dwell employing primarily passive components can acquire needed power from the ignition. As functions become more complex, a separate stable source of power is required. This is usually derived from either A.C. line current or the vehicle battery. The A.C. line supply is disadvantagous in that it requires the vehicle to be located near an A.C. outlet. The battery supply requires an extra hookup and generally limits the type of vehicle wiring system (polarity and voltage) with which the equipment will function.

SUMMARY OF THE INVENTION

Accordingly several objects of the invention are as follows: To provide an apparatus that indicates engine speed or dwell angle and automatically adjusts all such indications to read correctly for the engine being tested; thereby eliminating the confusion of excess meter scales and switches.

To provide an apparatus that is capable of selectivly disabling the ignition signal, so that the relative contribution of each cylinder can be determined; and further provides an indication of proper synchronization thereby eliminating incorrect diagnosis due to interference or improper hookup. To provide an apparatus that embodies all the above functions, and is capable of deriving all necessary operating power from the ignition primary signal, thereby eliminating problems associated with acquiring power from the vehicle battery or A.C. line.

Further objects and advantages of this invention will become apparent from a consideration of the drawings and ensuing description thereof.

DESCRIPTION OF THE DRAWINGS

FIG. 4 is a table of logic states for circuits used in the preferred embodiment of the present invention and relating to identified points in FIGS. 1 and 2.

DESCRIPTION OF THE PREFERRED EMBODIMENT

Figure 1:
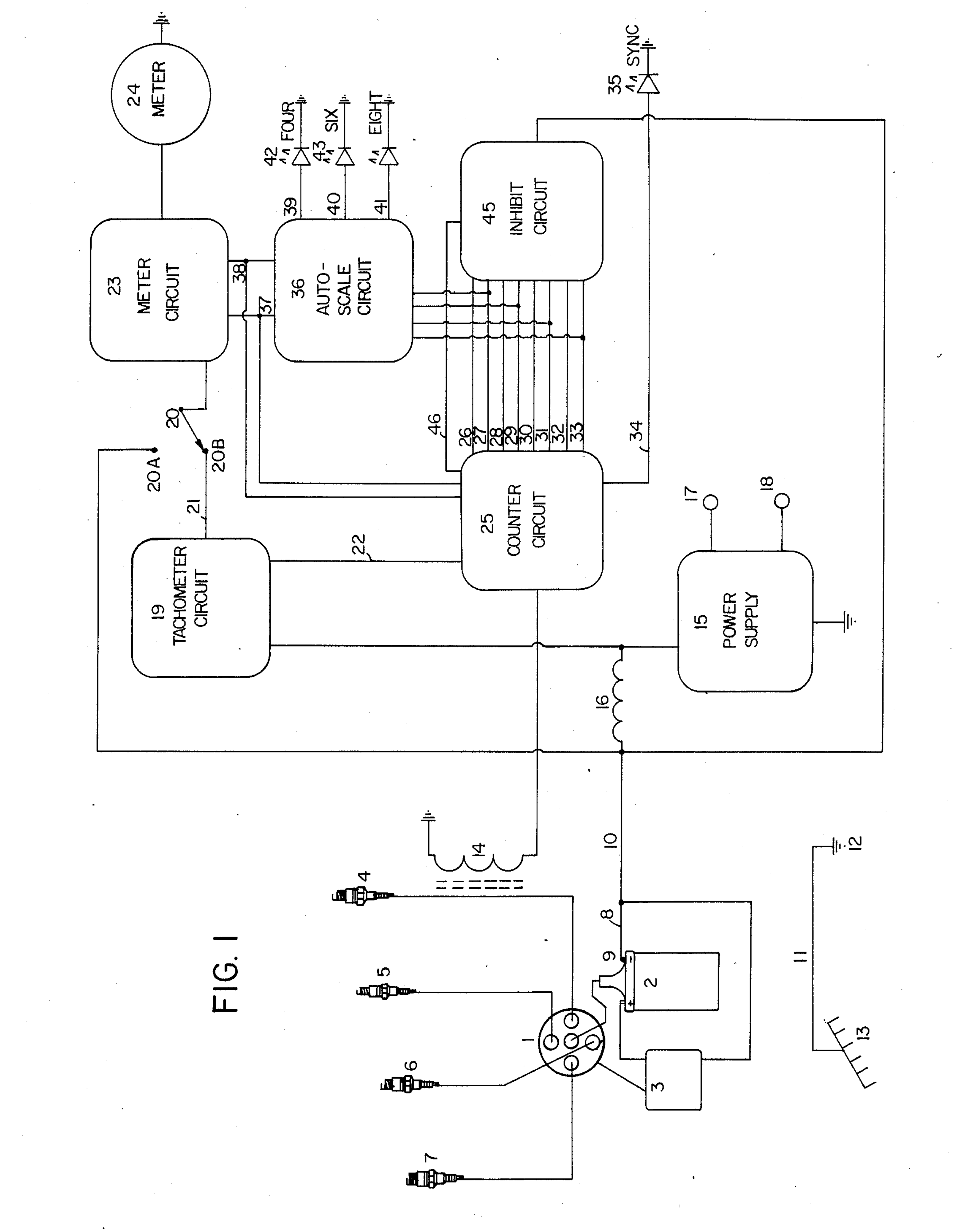
FIG. 1 is a block diagram of the preferred embodiment of the present invention. It is shown connected to the ignition system of a typical engine.

Referring to FIG. 1, the preferred embodiment of the invention is shown connected to a typical engine ignition system which consists of: Distributor 1, Coil 2, Control Module 3, and Ignitors 4, 5, 6, and 7; connected and working in a well known manner; wherein Control Module 3, receiving timing information from Distributor 1, supplies periodic current pulses to Coil 2, causing a high voltage pulse to appear at the output of Coil 2, which is then coupled through Distributor 1, to the appropriate Igniter, 4, 5, 6, or 7, for that firing interval.

Figure 3:
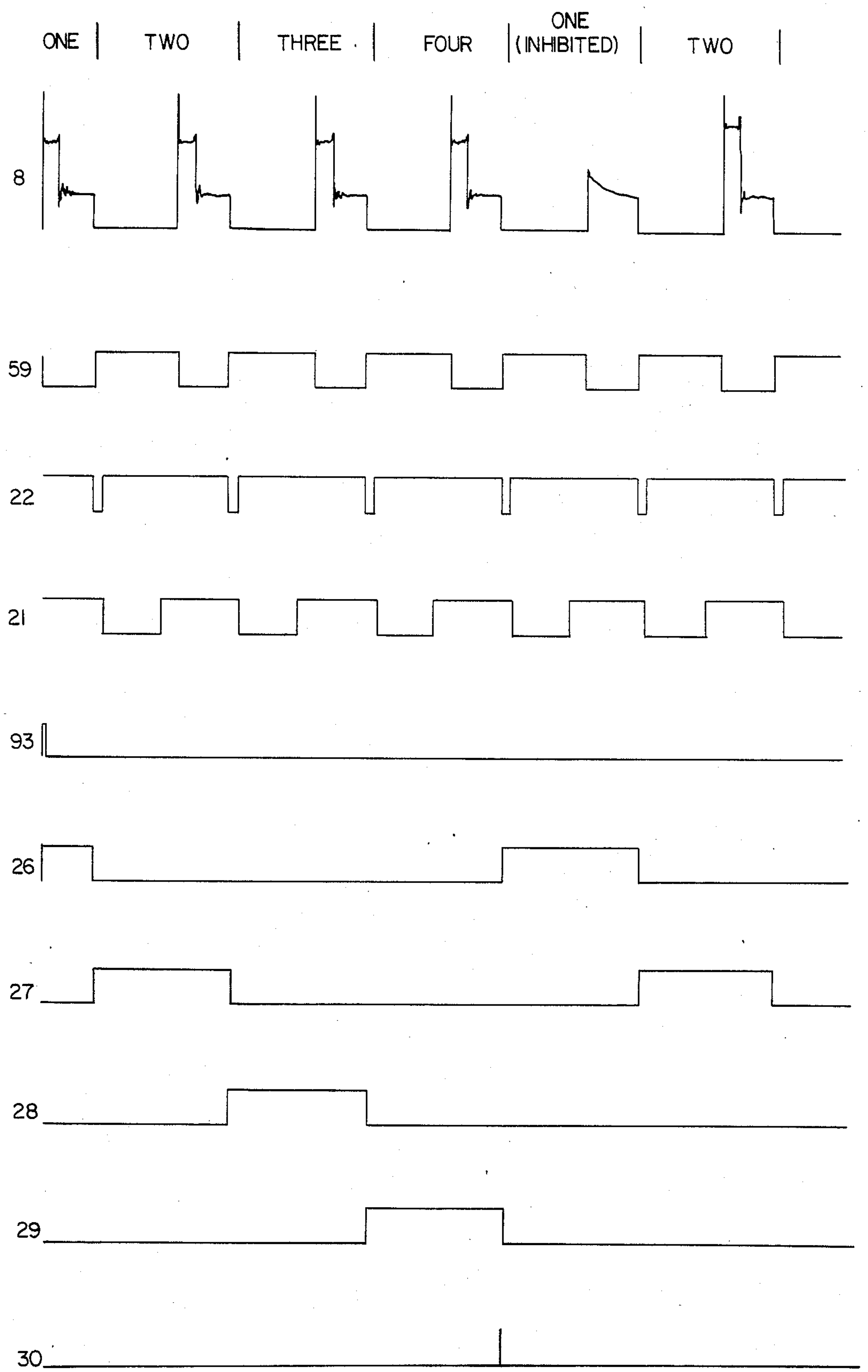
FIG. 3 is a drawing illustrating the approximate waveshapes and time relationship of signals at identified points in FIGS. 1 and 2.

The ignition primary signal 8, having a waveform as shown in FIG. 3, appearing at the coil terminal 9, which is commonly labeled (−) or (TACH), is coupled to the apparatus through conductor 10. Conductor 11 completes the circuit from the apparatus ground 12 to the engine ignition system ground 13. Coil 14 inductively couples the number one igniter 4 firing pulse into the apparatus.

The preferred embodiment of the present invention basically comprises a Power Supply 15, Tachometer Circuit 19, Meter Circuit 23, Counter Circuit 25, Auto-Scale Circut 36, and Inhibit Circuit 45; interconnected as shown in FIG. 1 and described in the following paragraphs:

Power Supply 15 receives the ignition primary signal 8 through conductor 10 and coil 16 and converts it to a regulated positive voltage 17 and a reference voltage 18 to supply power and reference voltage for the remaining circuitry.

Signal 8 is also coupled through coil 16 to the Tachometer Circuit 19, and directly to pole 20*a* of switch 20. Tachometer Circuit 19 converts signal 8 to signal 21, having a waveform as shown in FIG. 3, whose average voltage is inversely proportional to the frequency of signal 8. Signal 21 is conducted to pole 20*b* of switch 20. A narrow pulse signal 22, having a waveform as shown in FIG. 3, is output to Counter Circuit 25.

Meter Circuit 23 receives signal 8 or 21 as selected by switch 20 and converts it to an inversely proportional D.C. voltage that is read on meter 24.

Counter circuit 25 receives advancing pulses from Tachometer Circuit 19, signal 22, and resetting pulses from coil 14. Other inputs to Counter Circuit 25 include logic levels 37 and 38 from Auto-Scale Circuit 36. There are eight output lines, 26 through 33, representing states one through eight of Counter Circuit 25. The signals on these lines, having waveforms as shown in FIG. 3, are coupled to the Inhibit Circuit 45 and Auto-Scale Circuit 36. The line 34 representing state ten of Counter Circuit 25 is coupled to loss of SYNC. indicator 35.

The Auto-Scale circuit 36 receives inputs from lines 27, 29, 31, and 33 representing states two, four, six, and eight, respectively, of Counter Circuit 25. The Auto-Scale circuit outputs logic levels, depicted in FIG. 4, on lines 37 and 38 representing the highest count reached by Counter Circuit 25 before it is reset. Lines 37 and 38 are coupled to Counter Circuit 25 for internal resetting when reference Ignitor 4 is disabled by Inhibit Circuit 45. Three other outputs 39, 40, and 41 of Auto-Scale Circuit 36 cause one of indicators 42, 43, or 44 to illuminate; again dependent on the highest state reached by Counter Circuit 25 before resetting.

The Inhibit Circuit 45 receives inputs from lines 26 through 33 of Counter Circuit 25 and disables the ignition signal 8 on conductor 10 for a selected interval. Line 46 is coupled back to Counter Circuit 25 internally when the reference Ignitor 4 is disabled by the apparatus.

Figure 2:
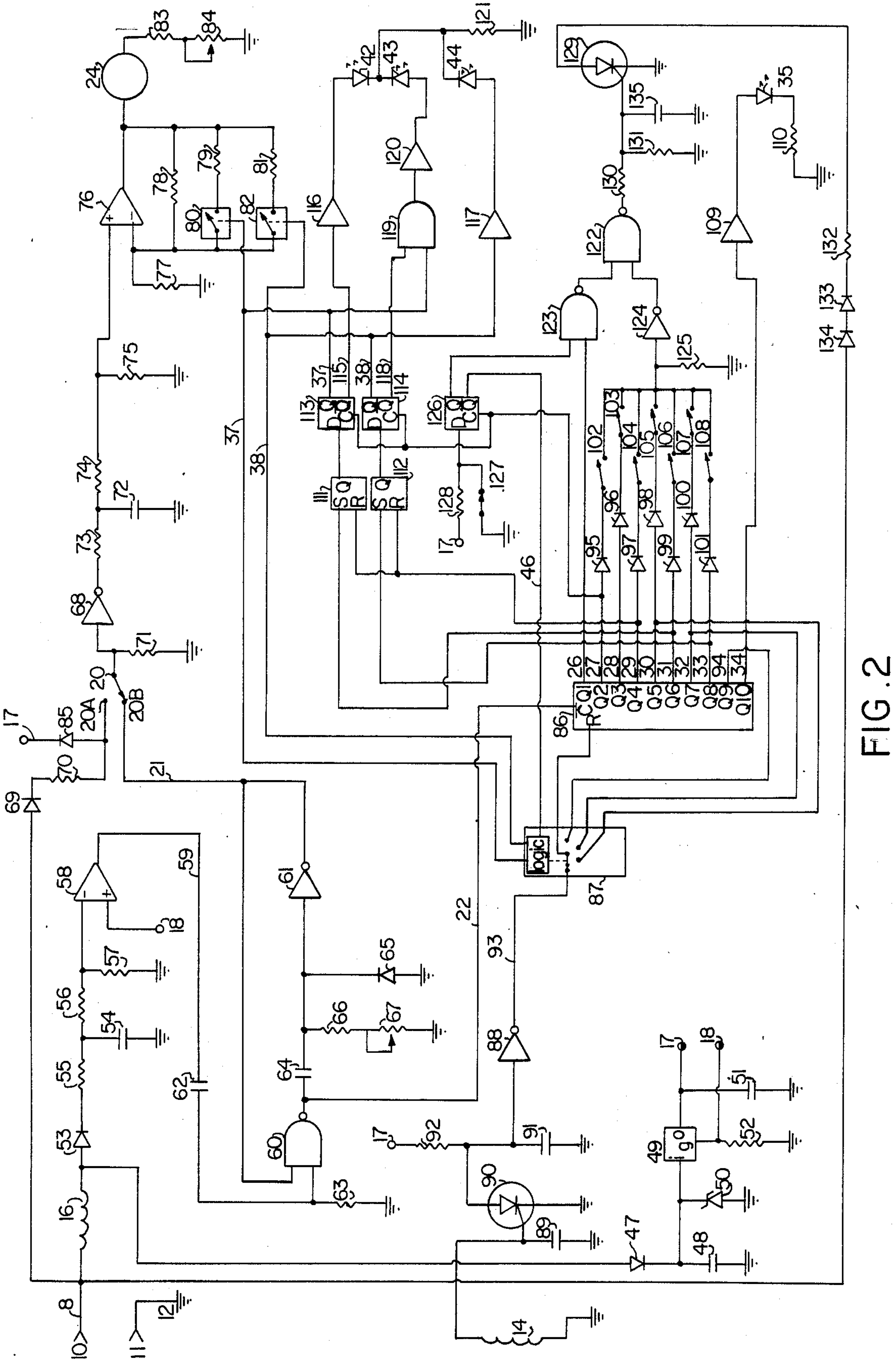
FIG. 2 is an electrical and logic schematic of the preferred embodiment of the present invention.

OPERATION Referring to FIG. 2, the operation of individual blocks identified in FIG. 1 is detailed in the following paragraphs:

Power Supply 15

All operating power for the apparatus is derived from the ignition primary signal 8 of the engine under test. The apparatus requires several milliamperes of operating current. Even this small current draw would normally load the high frequency (spark generating) portion of the ignition signal; however, coil 16 limits the high frequency current to a negligible value and provides a current limiting resistance for lower frequencies. Diode 47 passes only positive portions of the ignition waveform, charging capacitor 48 to the peak value of the waveform. The D.C. voltage at capacitor 48 is applied to the input terminal of regulator integrated circuit 49. Zener diode 50 provides over-voltage protection for regulator 49 and capacitor 48. Two regulated power sources are provided by regulator 49. The usual regulated output 17 is the main supply for all circuitry. Capacitor 51 filters any transients that may occur on that line. The voltage developed across resistor 52 by the operating current of regulator 49 is used as a reference source 18 by Tachometer Circuit 19.

Tachometer Circuit 19

Tachometer Circuit 19 provides an output signal 21, whose waveform, as shown in FIG. 3, has an average voltage proportional to the frequency (R.P.M.) of the ignition signal.

The input signal 8, with waveform shown in FIG. 3, for the circuit is taken from the filtered side of coil 16. Diode 53 passes only the positive portion of the signal and capacitor 54 filters any remaining high frequencies. Resistors 55, 56, and 57 form a voltage divider; whose output is applied to the inverting input of comparator 58. When the voltage at the inverting input of comparator 58 exceeds reference voltage 18 at its non-inverting input, its output is driven low. At all other times the output is high. Thus the output of comparator 58 is a 'clean' rectangular signal 59, inverted and time coincident with the ignition signal 8. FIG. 3 illustrates this signal 59 showing its time relationship to signal 8. The output level of comparator 58 is designed to switch when ignition signal 8 exceeds a level that will insure usability with electronic ignition systems having elevated baselines.

A NAND gate 60 and inverter 61 are used in a modified monostable multivibrator circuit to generate the tachometer signal 21. In the resting state the outputs of both gate 60 and inverter 61, are high; the input of inverter 61 is low, and the input of gate 60 that connects to capacitor 62 is low. When the output of comparator 58 goes positive, corresponding to the beginning of the dwell period, as illustrated in FIG. 3, a positive voltage appears at that input of gate 60 until capacitor 62 charges through resistor 63. Gate 60's output is driven low until capacitor 62 charges to approximately half the supply voltage. The resulting narrow negative pulse at gate 60's output is used to discharge capacitor 64 through diode 65. When gate 60's output goes high at the end of the narrow pulse 22, the input of inverter 61 is driven high until capacitor 64 is charged through resistors 66 and 67. The output of inverter 61 is driven low until capacitor 64 has charged to approximately half the supply voltage; this output signal 21 is coupled back to one of the inputs of gate 60 causing it to disregard its other input until the output of inverter 61 returns to its resting (high) state. The low time of the output signal 21 from inverter 61 is determined by capacitor 64 and resistors 66 and 67; variable resistor 67 being used to compenstate for varying circuit parameters. The high time of signal 21 is determined by the frequency of the input signal. Therefore, as the frequency of the input signal increases, the average voltage of the output signal will decrease.

In a conventional monostable multivibrator, the timing capacitor is discharged during the stable (resting) period. The charge remaining on the timing capacitor when the multivibrator is triggered, and hence, the unstable time period is affected by the frequency of the input signal. This causes linearity problems when such a circuit is used for frequency to voltage conversions. In the described circuit the timing capacitor 64 is discharged to a level set by the charging time of capacitor 62 through resistor 63, eliminating this linearity problem.

The output signal 21 of inverter 61 goes through switch 20 to Meter Circuit 23 for conversion to a meter indication of engine speed (R.P.M.). The narrow pulse output signal 22 of gate 60 is used to advance Counter Circuit 25.

Meter Circuit 23

Meter Circuit 23 converts the waveforms, 8 or 21, as illustrated in FIG. 3, representing dwell or engine speed, respectively, to an observable indication on meter 24. Dwell or tachometer functions are selected by switch 20. In the tachometer mode, inverter 68 receives input signal 21 from the Tachometer Circuit 19. In the Dwell mode, the positive portion of ignition signal 8 is passed by diode 69 through resistor 70, through switch 20, to the input of inverter 68. Resistor 71 protects the input of inverter 68 from voltage transients. Since the input to inverter 68 consists of signals 8 or 21, as selected by switch 20, whose average voltages are inversely proportional to dwell or engine speed, respectively; the output of inverter 68 is a signal with an average voltage directly proportional to dwell or engine speed. This signal is applied to an averaging network formed by capacitor 72 and resistors 73, 74, and 75. The RC time constant of this circuit is long in comparison to the period of the input signal, causing capacitor 72 to charge to a voltage proportional to the average voltage of the waveform. The voltage at capacitor 72 is reduced by the divider network formed by resistors 73, 74, and 75 to an appropriate level and applied to the non-inverting input of operational amplifier 76. The gain of amplifier 76 is determined by resistors 77 and 78 in the four cylinder mode. In the six cylinder mode, resistor 79 is placed in parallel with resistor 78 by semiconductor switch 80, lowering the gain of amplifier 76 by an appropriate factor. In the eight cylinder mode resistor 81 is also switched into the circuit, by semiconductor switch 82, again lowering the gain. The output of amplifier 76 drives a series voltmeter circuit consisting of meter 24 and resistors 83 and 84. Resistor 84 is used to adjust circuit parameters when the apparatus is in the dwell mode. Semiconductor switches 80 and 82 are controlled by the Auto-Scale Circuit 36, providing automatic scale adjustments that eliminate the need for multiple and confusing meter scales. Diode 85 limits the ignition signal level used to represent dwell, thereby providing protection for inverter 68 and switch 20. Resistor 70 limits the current through diodes 69 and 85. The switching level of inverter 68 together with the voltage drop across diode 69 insures accurate dwell measurements even when ignition signal 8 has an elevated baseline.

Counter Circuit 25

Counter Circuit 25 provides output signals corresponding to the cylinder ignition sequence of the engine under test to the Auto-Scale 36 and Inhibit 45 circuits. Decade counter 86 is advanced one state by each negative pulse 22 from gate 60, time coincident with the beginning of the dwell period, as illustrated in FIG. 3. Counter 86 is reset to the number one cylinder state by pulses from a multiple input semiconductor switch 87. The output of semiconductor switch 87 is selected either from inverter 88 or lines 30, 32, or 94 of counter 86 by logic levels provided by the Auto-Scale Circuit 36. Normally, number one igniter current is inductively coupled to coil 14. Coil 14 consists of several turns of wire wound on a split ferrite core that is clamped around the number one igniter 4 wire of the engine under test. Coil 14 together with capacitor 89 comprises a tuned circuit resonant at typical ignitor firing frequencies; thus when an impulse to fire number one igniter 4 occurs, a voltage is developed across capacitor 89 that triggers thyristor 90 discharging capacitor 91 and consequently driving the output of inverter 88 high. When the discharge current of capacitor 91 falls below a certain level, thyristor 90 can no longer conduct; this time is very short, being determined primarily by the on-state resistance of thyristor 90. Capacitor 91 now charges through resistor 92 switching the output of invertor 88 low when its charge reaches approximately half the supply voltage. This provides a narrow pulse 93, as illustrated in FIG. 3, to semiconductor switch 87 that is time coincident with the firing of number one ignitor 4 of the engine under test. Normally this pulse is coupled through semiconductor switch 87 to reset the counter. If semiconductor switch 87 receives a logic LOW on input 46 from Inhibit Circuit 45, indicating that the number one ignitor 4 is to be inhibited; then the output is selected from lines 30, 32, or 94, representing states five, seven, or nine, respectively, of counter 25. The line selected is determined by the logic levels on lines 37 and 38 of Auto-Scale Circuit 36; resetting counter 25 to the number one state as it tries to count above the highest state in the firing sequence of the engine under test. FIGS. 3 and 4 illustrate the waveforms and logic levels associated with this process. The outputs, 27 through 33 of counter 25 representing states two through eight, respectively, are coupled to the Inhibit Circuit through diodes 95 through 101 and switches 102 through 108. Diodes 95 through 101 provide isolation, allowing more than one of the switches, 102 through 108 to be closed at the same time. Output 26, representing the number one state, receives further processing by the Inhibit Circuit 45 to insure proper synchronization of counter 86 with the engine when the number one ignitor 4 is inhibited by the apparatus. Outputs 27, 29, 31, and 33, representing states two, four, six and eight of counter 86, are coupled to the Auto-Scale Circuit 36. Buffer 109 receives a signal from line 34 of counter 86, illuminating light emitting diode (hereafter LED) 35 if the counter state is ever allowed to reach ten. This provides a visual indication of loss of synchronization due to trouble in the reference cylinder or improper hook-up. Resistor 110 limits current in LED 35.

Auto-Scale Circuit 36

The Auto-Scale Circuit 36 supplies logic outputs 37 and 38 to the Meter 23 and Counter 25 circuits dependent on the last state reached by counter 86 before it is reset. Visual indication of the number of cylinders of the engine under test, and therefore further indication of proper synchronization, is also provided. Set/Reset flip-flop 111 is set when output 31, representing the number six state of counter 86, goes high. Set/Reset flip-flop 112 is set when line 33, representing the number eight state of counter 86, goes high. Both flip-flops 111 and 112 are reset by a high level on line 29, representing state four of counter 86. The data from Set/Reset flip-flops 111 and 112 is clocked into two 'D' type flip-flops 113 and 114 when output 27, representing state two of counter 86, goes high.

As illustrated in FIG. 4, the outputs of flip-flops 113 and 114 are representative of the number of cylinders in the engine under test. The $\overline{Q}$ output 115 of flip-flop 113, being high only when the cylinder count is less than or equal to four, is used to activate buffer 116 illuminating LED 42, the four cylinder indicator. The Q line 38 of flip-flop 114 is high only when the cylinder count is seven or greater. This line, when high, activates buffer 117 illuminating LED 44, the eight cylinder indicator. If the cylinder count is five or six the Q line 37 of flip-flop 113 and the $\overline{Q}$ line 118 of flip-flop 114 will both be high. These outputs are 'ANDed' by gate 119, the resulting high output of 119 drives the output of buffer 120 high, illuminating LED 43, the six cylinder indicator. Resistor 121 limits current in LED's 42, 43, and 44.

The Q lines 37 and 38 of flip-flop 11 and flip-flop 114, respectively, are used to control the state of switches 80 and 82, in the Meter Circuit 23, providing automatic adjustment of dwell and tachometer readings according to the number of cylinders of the engine under test. The same lines also control the state of switch 87, in the Counter Circuit 25, when the number one ignitor 4 is inhibited, insuring proper resetting of the counter 86.

Inhibit Circuit 45

Inhibit Circuit 45 receives cylinder number to be killed information from the Counter Circuit 25 and prevents the firing of the ignitors of the engine under test for the selected intervals.

If either input of NAND gate 122 is low, its output will be high. NAND gate 122's inputs are connected to the outputs of NAND gate 123 and inverter 124. The input of inverter 124 is connected to the common line of switches 102 through 108. If any switch is closed, the signal on the corresponding line is inverted by inverter 124, providing a low to one input of gate 122 for the selected interval. Resistor 125 keeps the input of gate 124 from floating high.

Gate 123 must receive interval number one information from counter 86 line 26 and a high logic level from the Q output of 'D' type flip-flop 126 for its output to go low. The D input of flip-flop 126 is normally held low through switch 127. When switch 127 is opened the D input of 126 is held high through resistor 128. The level on the D input of flip-flop 126 is clocked to the output by the number two interval signal 27 of counter 86. The Q output of flip-flop 126 provides a logic level to semiconductor switch 87 causing it to select resetting pulses from counter 86 when switch 127 is open. The delay caused by flip-flop 126 is necessary to insure synchronization of counter 86 to the engine under test when the number one igniter 4 is disabled by the apparatus; even if switch 127 is opened during the number one interval.

The output of gate 122 is therefore a series of high logic pulses corresponding to ignition intervals selected by switches 102 through 108 and 127. These levels begin with the dwell period of the selected interval and supply gate current to thyristor 129 through resistors 130 and 131. Thyristor 129 will conduct when the gate signal is present and the ignition signal 8, conducted through resistor 132 and diodes 133 and 134, exceeds the baseline level. As depicted in FIG. 3, this corresponds to the spark interval of the selected cylinder. The current flow through thyristor 129 prevents the collapse of the magnetic field of ignition coil 2, thus preventing the firing of the ignitor for the selected interval.

Resistors 130 and 131 limit the gate current to thyristor 129. Resistor 132 limits anode to cathode current through thyristor 129 to a safe value, both for thyristor 129 and the ignition system of the engine under test. Diodes 133 and 134 provide a voltage drop sufficient to insure non-conduction of thyristor 129 during the dwell period, when the apparatus is used on ignition systems having elevated baselines. Capacitor 135 prevents false triggering of thyristor 129 by transients coupled internally through 129 from the ignition signal 8.

While the preceding description contains many specificities, these should not be construed as limitations on the scope of the invention, but rather as an exemplification of one preferred embodiment. Many other variations are possible. For example: Meter 24 could be replaced with an analog to digital converter and appropriate circuitry to provide a digital rather than analog display. In the preferred embodiment, indication and reading compensation are provided for four, six, or eight cylinder engines. Additional Auto-Scale and counter circuitry of a similar nature could be employed to provide indication and reading compensation for engines having any number of cylinders. Accordingly, the scope of the invention should be determined not by the embodiment illustrated, but by the appended claims.

What is claimed is:

1. A diagnostic apparatus for internal combustion engines of the type having multiple electrical ignitors energized by electrical ignition pulses in response to a periodic ignition primary signals from a source of the ignition primary signal, the apparatus comprising:

engine diagnostic circuit means having an input for receiving ignition primary signals, the engine diagnostic circuit means comprising means for evaluating at least one characteristic of performance of the engine being diagnosed from the ignition primary signals, the engine diagnostic circuit means also comprising means for producing an engine diagnostic output signal corresponding to the performance characteristic;

conversion circuit means having a first input means for receiving the engine diagnostic output signal, the conversion circuit means comprising means for converting the received engine diagnostic output signal into a visual represntation of the characteristic of performance of the engine being diagnosed;

cylinder number determination circuit means having a first input means coupled to the source of ignition primary signals and second input means coupled to one of the ignitors for detecting the electrical ignition pulses applied to said one ignitor, the cylinder number determination circuit means comprising means for automatically determining the number of cylinders in the engine being diagnosed from the ignition primary signals and detected ignition pulses, the cylinder number determination circuit means also comprising means for producing a scaling output signal corresponding to the number of cylinders in the engine being diagnosed; and the conversion circuit means having second input means for receiving the scaling output signal and scale adjustment circuit means for adjusting the received engine diagnostic output signal for the number of cylinders in the engine being diagnosed, in response to the scaling output signal, such that the visual representation corresponds to the characteristic of performance of the engine being diagnosed.

2. A diagnostic apparatus according to claim 1 in which the engine diagnostic circuit means includes tachometer circuit means for evaluating the revolutions per unit time of the engine being diagnosed and the characteristic of performance is the revolutions per unit time of the engine being diagnosed.

3. A diagnostic apparatus according to claim 1 in which the engine diagnostic circuit means includes dwell circuit means for evaluating the dwell of the engine being diagnosed and the characteristic of performance is the dwell of the engine being diagnosed.

4. A diagnostic apparatus according to claim 1 in which the engine diagnostic circuit means includes tachometer circuit means for evaluating the revolutions per unit time of the engine being diagnosed and dwell circuit means for evaluating the dwell of the engine being diagnosed, the performance characteristic corresponding to the revolutions per unit time and to the dwell of the engine being diagnosed.

5. A diagnostic apparatus according to claim 1 in which the engine diagnostic circuit means includes tachometer circuit means for evaluating the revolutions per unit time of the engine being diagnosed and for producing a tachometer circuit output signal corresponding to such revolutions per unit time, the engine diagnostic circuit means including dwell circuit means for evaluating the dwell of the engine being diagnosed and for producing a dwell circuit output signal corresponding to such dwell, the engine diagnostic circuit means also including manual switch means for selecting either the tachometer circuit output signal or the dwell circuit output signal as the engine diagnostic output signal.

6. A diagnostic apparatus according to claim 1 including power supply circuit means having an input for receiving ignition primary signals as the only source of power for the apparatus, the power supply means having power supply output means coupled to the engine diagnostic circuit means and to the cylinder number determination circuit means, the power supply means comprising means for supplying power at the power supply output means.

7. A diagnostic apparatus according to claim 1 in which the engine diagnostic circuit means comprises means for producing an engine diagnostic output signal having a voltage of a magnitude which corresponds to the performance characteristic, the conversion circuit means including averaging circuit means for averaging the engine diagnostic output signal, amplifier means for amplifying the averaged engine diagnositc output signal to provide an amplifier output signal which is an amplified representation of the averaged engine diagnostic output signal, and a meter for receiving the amplifier output signal and visually representing the performance characteristic.

8. A diagnostic apparatus according to claim 7 in which the scale adjustment circuit means comprises means for adjusting the gain of the amplifier means in response to the scaling output signal.

9. A diagnostic apparatus according to claim 8 in which the engine diagnostic circuit means includes tachometer circuit means for evaluating the revolutions per unit time of the engine being diagnosed and the characteristic of performance is the revolutions per unit time of the engine being diagnosed, the tachometer circuit means comprising frequency to voltage circuit means for producing an engine diagnostic output signal which is a voltage signal having an average magnitude corresponding to the frequency of the ignition primary signals received at the input to the engine diagnostic circuit means and thereby to the revolutions per unit time of the engine being diagnosed.

10. A diagnostic apparatus according to claim 9 in which the frequency to voltage circuit means comprises means for producing a engine diagnostic output signal which is a voltage signal having an average magnitude which is inversely related to the frequency of the ignition primary signals received at the input to the engine diagnostic circuit means.

11. A diagnostic apparatus according to claim 10 in which the frequency to voltage circuit means comprises monostable multivibrator means including timing capacitor means and means for discharging the timing capacitor means to a predetermined level upon the occurrence of each ignition primary signal and thereby at the commencement of each dwell period, means for charging the timing capacitor means following its discharge to the predetermined level, output means coupled to the timing capacitor means for providing a voltage output signal which is at a first magnitude for a predetermined time following the discharge of the timing capacitor means and is otherwise at a second magnitude, the voltage output signal comprising the engine diagnostic output signal.

12. A diagnostic apparatus according to claim 11 in which the frequency to voltage circuit means includes comparator circuit means for receiving the ignition primary signals and providing a comparator output, a nand gate having first and second inputs and an output, an inverter having an input and an output, a first capacitor coupled in series between the comparator output and the first nand gate input, a first resistor coupled from the first nand gate input to ground potential, the timing capacitor being coupled in series from the nand gate output to the inverter input, the inverter output being coupled to the second nand gate input and the inverter output also comprising an output of the engine diagnostic circuit means, second resistor means coupled from the input of the inverter to ground potential and a diode having its cathode coupled to the inverter input and its anode coupled to ground potential.

13. A diagnostic apparatus according to claim 1 in which the cylinder number determination circuit means comprises counter means having first input means for receiving signals corresponding to the ignition primary signals, the counter means comprising means for counting the received signals and thereby the ignition primary signals, the cylinder number determination circuit means also including means for generating a reference signal corresponding to the ignition pulses applied to said one ignitor, the counter circuit means having reset input means for receiving the reference signal, the counter circuit means providing a first output signal upon receiving the reference signal and successive output signals upon the occurrence of each successive ignition primary signal until the reference signal is again received at which time the counter means is reset and the first output signal is repeated, the number of primary ignition pulses counted between resetting of the counter means indicating the number of cylinders in the engine being diagnosed, and scaling output signal generation circuit means for receiving the counter output signals and for producing the scaling output signal.

14. A diagnostic apparatus according to claim 13 including inhibit circuit means for receiving the output signals from the counter means and for determining which ignitor is being energized relative to said one ignitor, the inhibit circuit means being coupled to the source of the ignition primary signals for selectively interrupting the ignition primary signals and ignition pulses to thereby inhibit the energization of one or more ignitors, the cylinder number determination circuit means also including means for internally generating and applying a reset signal to the reset input means when said one ignitor is inhibited by the inhibit circuit means.

15. A diagnostic apparatus according to claim 14 including loss of synchronization indicator means for receiving the output signals from the counter means and for visually indicating that the counter means has counted a number ignition pulses between resetting of the counter means which is in excess of a predetermined maximum.

16. A diagnostic apparatus for internal combustion engines of the type having multiple electrically ignitors energized by electrical ignition pulses in response to a periodic ignition primary signals from a source of ignition primary signals, the apparatus comprising;

engine diagnostic circuit means having an input for receiving ignition primary signals, the engine diagnostic circuit means comprising means for evaluating at least one characteristic of performance of the engine being diagnosed from the ignition primary signals, the engine diagnostic circuit means also comprising means for producing an engine diagnostic output signal corresponding to the performance characteristic; the engine diagnostic circuit means including tachometer circuit means for evaluating the revolutions per unit time of the engine being diagnosed and for producing a tachometer output signal corresponding to such revolutions per unit of time, the engine diagnostic circuit means including dwell circuit means for evaluting the dwell of the engine being diagnosed and for producing a dwell circuit output signal corresponding to such dwell, the engine diagnostic circuit means including manual switch means for selecting either the tachometer circuit output signal or the dwell circuit output signal as the engine diagnostic output signal;

conversion circuit means having a first input means for receiving the engine diagnostic output signal, the conversion circuit means comprising means for converting the received engine diagnostic output signal into a visual representation of the characteristic of performance of the engine being diagnosed;

cylinder number determination circuit means having a first input means coupled to the source of ignition primary signals and second input means coupled to one of the ignitors for detecting the electrical pulses applied to said one ignitor, the cylinder number determination circuit means comprising means for automatically determining the number of cylinders in the engine being diagnosed from the ignition primary signals and detected ignition pulses, the cylinder number determination circuit means also comprising means for producing a scaling output signal corresponding to the number of cylinders in the engine being diagnosed;

the conversion circuit means having second input means for receiving the scaling output signal and scale adjustment circuit means for adjusting the received engine diagnostic output signal for the number of cylinders in the engine being diagnosed;

the engine diagnostic circuit means comprising means for producing an engine diagnostic output signal which is a voltage signal of a magnitude which corresponds to the performance characteristic;

the conversion circuit means including averaging circuit means for averaging the engine diagnostic output signal, amplifier means for amplifying the averaged engine diagnostic output signal to provide an amplifier output signal which is an amplified representation of the averaged engine diagnostic output signal, and means for receiving the amplifier output signal and visually representing the performance characteristic; and the scale adjustment circuit means comprising means for adjusting the gain of the amplifier means in response to the scaling output signal.

17. A diagnostic apparatus according to claim 16 in which the cylinder number determination circuit means comprises counter means having first input means for receiving signals corresponding to ignition primary signals, the counter means comprising means for counting the received signals and thereby the ignition primary signals, the cylinder number determination circuit means also including means for generating a reference signal corresponding to the ignition pulses applied to said one ignitor, the counter circuit means having rest input means for receiving the reference signal, the counter circuit means providing a first output signal upon receiving a reference signal and successive output signals upon the occurrence of each successive ignition primary signal until the reference signal is again received at which time the counter means is reset and the first output signal is repeated, the number of primary ignition pulses counted between resetting of the counter means indicating the number of cylinders in the engine being diagnosed, scaling output signal generation circuit means for receiving the counter output signals and for producing the scaling output signal; and inhibit circuit means for receiving the output signals from the counter means and for determining which ignitor is being energized relative to said one ignitor, the inhibit circuit means being coupled to the source of ignition primary signals for selectively interrupting the ignition primary signals and ignition pulses to thereby inhibit the energization of one or more ignitors, the cylinder number determination means also including means for internally generating and applying a reset signal to the reset input means when said one ignitor is inhibited by the inhibit circuit means.

* * * * *